United States Patent [19]

Hanes

[11] Patent Number: 5,756,578
[45] Date of Patent: May 26, 1998

[54] BLENDS OF POLY (ETHYLENE TEREPHTHALATE) AND MONOVINYLARENE/CONJUGATED DIENE BLOCK COPOLYMERS

[75] Inventor: Mark D. Hanes, Bartlesville, Okla.

[73] Assignee: Phillips Petroleum Company, Bartlesville, Okla.

[21] Appl. No.: 655,062

[22] Filed: May 29, 1996

Related U.S. Application Data

[63] Continuation-in-part of Ser. No. 371,324, Jan. 11, 1995, abandoned.

[51] Int. Cl.$^6$ .................................................. C08L 67/02
[52] U.S. Cl. .............................................. 525/92 F; 525/444
[58] Field of Search ............................ 525/92 F, 444

[56] References Cited

U.S. PATENT DOCUMENTS

| | | | |
|---|---|---|---|
| 4,483,949 | 11/1984 | Semen et al. | 523/514 |
| 4,675,970 | 6/1987 | Shiraki et al. | 525/92 |
| 4,745,148 | 5/1988 | Chung et al. | 524/504 |
| 5,041,499 | 8/1991 | Blakely | 525/92 |
| 5,149,734 | 9/1992 | Fisher et al. | 524/423 |
| 5,162,416 | 11/1992 | Udipi | 524/399 |
| 5,391,619 | 2/1995 | Hanes | 525/92 |

OTHER PUBLICATIONS

Eastman Polyester Plastics, Kodar PETG, Copolyester 6763, Eastman Chemical Company, Publication MB–804, (Mar. 1, 1991).

*Primary Examiner*—Patricia A. Short
*Attorney, Agent, or Firm*—Carl D. Corvin

[57] ABSTRACT

A composition comprising (A) a monovinylarene/conjugated diene block copolymer, (B) an amorphous poly (ethylene terephthalate), and (C) a crystalline poly(ethylene terephthalate). A process for preparing the composition and articles manufactured from the composition are also provided.

41 Claims, No Drawings

BLENDS OF POLY (ETHYLENE TEREPHTHALATE) AND MONOVINYLARENE/CONJUGATED DIENE BLOCK COPOLYMERS

This application is a continuation-in-part of Ser. No. 08/371,324 filed Jan. 11, 1995, now abandoned.

This invention relates to blends comprising monovinylarene/conjugated diene block copolymer, amorphous poly(ethylene terephthalate), and crystalline poly (ethylene terephathlate).

BACKGROUND

Monovinylarene/conjugated diene copolymers are known and useful for a variety of purposes. Polymers that can be formed into colorless, transparent articles having good physical properties are of particular interest. Such articles are useful in packaging such as blister packaging, and the manufacture of toys, window pieces, beverage containers and items of the like.

It would therefore be desirable to develop useful polymer blends having a combination of good clarity, stiffness, and toughness.

SUMMARY OF THE INVENTION

It is an object of this invention to provide a polymer blend having a combination of good clarity, stiffness and toughness.

It is another object of this invention to provide a process for preparing a polymer having good clarity and good mechanical properties.

In accordance with this invention, a composition comprising:

(A) a monovinylarene/conjugated diene block copolymer wherein the monovinylarene is present in said monovinylarene/conjugated diene block copolymer in an amount in the range of from about 60 weight percent to about 95 weight percent based on the weight of the monovinylarene/conjugated diene block copolymer, wherein the conjugated diene is present in said monovinylarene/conjugated diene block copolymer in an amount in the range of from about 40 weight percent to about 5 weight percent based on the weight of the monovinylarene/conjugated diene block copolymer, (B) an amorphous poly(ethylene terephthalate), and (C) a crystalline poly(ethylene terephthalate), wherein said composition exhibits Gardner haze of about 6 percent or less for a 50 mil sample, is provided.

In further accordance with another embodiment of this invention, a composition comprising:

(A) a monovinylarene/conjugated diene block copolymer present in an amount in the range of from about 10 weight percent to about 90 weight percent based on the total weight of the polymer blend, wherein said monovinylarene is present in an amount in the range of from about 60 weight percent to about 95 weight percent based on the weight of the monovinylarene/ conjugated diene block copolymer, and wherein said conjugated diene is present in an amount in the range of from about 40 weight percent to about 5 weight percent based on the weight of the monovinylarene/ conjugated diene block copolymer;

(B) an amorphous poly(ethylene terephthalate) present in an amount in the range of from about 5 weight percent to about 85 weight percent based on the total weight of the polymer blend, wherein the amorphous poly(ethylene terephthalate) is modified with a modifying agent selected from the group consisting of diols, diacids, dihydroxy acids and mixtures thereof, such that crystallization of the poly(ethylene terephthalate) is prevented from occuring;

(C) a crystalline poly(ethylene terephthalate) present in an amount in the range of from about 5 weight percent to about 85 weight percent based on the total weight of the polymer blend; and wherein said composition exhibits haze of about 6 percent or less for a 50 mil sample, is provided.

In yet further accordance with another embodiment of this invention, a composition consisting essentially of:

(A) a monovinylarene/conjugated diene block copolymer wherein the monovinylarene is present in said monovinylarene/conjugated diene block copolymer in an amount in the range of from about 60 weight percent to about 95 weight percent based on the weight of the monovinylarene/conjugated diene block copolymer, wherein the conjugated diene is present in said monovinylarene/conjugated diene block copolymer in an amount in the range of from about 40 weight percent to about 5 weight percent based on the weight of the monovinylarene/conjugated diene block copolymer, (B) an amorphous poly(ethylene terephthalate), and (C) a crystalline poly(ethylene terephthalate), wherein said composition exhibits Gardner haze of about 6 percent or less for a 50 mil sample, is provided.

In still further accordance with another embodiment of this invention, a composition consisting essentially of:

(A) a monovinylarene/conjugated diene block copolymer present in an amount in the range of from about 10 weight percent to about 90 weight percent based on the total weight of the polymer blend, wherein said monovinylarene is present in an amount in the range of from about 60 weight percent to about 95 weight percent based on the weight of the monovinylarene/ conjugated diene block copolymer, and wherein said conjugated diene is present in an amount in the range of from about 40 weight percent to about 5 weight percent based on the weight of the monovinylarene/ conjugated diene block copolymer;

(B) an amorphous poly(ethylene terephthalate) present in an amount in the range of from about 5 weight percent to about 85 weight percent based on the total weight of the polymer blend, wherein the amorphous poly(ethylene terephthalate) is modified with a modifying agent selected from the group consisting of diols, diacids, dihydroxy acids and mixtures thereof, such that crystallization of the poly(ethylene terephthalate) is prevented from occuring;

(C) a crystalline poly(ethylene terephthalate) present in an amount in the range of from about 5 weight percent to about 85 weight percent based on the total weight of the polymer blend; and wherein said composition exhibits haze of about 6 percent or less for a 50 mil sample, is provided.

In accordance with other embodiments of this invention, a process and processes for preparing the composition and articles prepared therefrom is also provided.

DETAILED DESCRIPTION OF THE INVENTION

Any means known in the art is suitable to produce the component polymers of final polymer products employed in the present invention. Many suitable polymers are commercially available.

The component (A) monovinylarene/conjugated diene block copolymers useful in this invention are block copolymers having a melt flow greater than 0.1 g/10 min., preferably in the range of from about 0.1 g/10 min. to about 100 g/10 min. (measured according to ASTM D-1238, Condition G). This is due to the fact that a melt flow lower than 0.1 g/10 min. significantly inhibits flow while a melt flow greater than 100 g/10 min. indicates a molecular weight which is too low to obtain desirable mechanical properties. Preferably the monovinylarene/conjugated diene block copolymers will have a notched Izod impact strength of greater than or equal to 0.3 ft lbs/in. measured according to ASTM D-256. Notched Izod impact strength values lower than 0.3 ft lbs/in indicates that the copolymers will not have enough impact strength when incorporated into a blend.

The monovinylarene/conjugated diene block copolymers are generally or can be prepared by a solution process involving sequential polymerization of a monovinylarene monomer and a conjugated diene monomer. Optionally, a monovinylarene monomer/conjugated diene monomer mixture can be polymerized to form a monovinylarene/conjugated diene block copolymer. In some circumstances, if desired, the polymer chains can be coupled to form multimodal block copolymers having a broad molecular weight distribution.

The basic starting materials and polymerization conditions for preparing monovinylarene/conjugated diene block copolymer are disclosed in U.S. Pat. Nos. 4,091,053; 4,584,346; 4,704,434; 4,704,435; and 5,227,419; the disclosures of which are hereby incorporated by reference.

In a typical preparation method of these publications, a conjugated diene monomer and a monovinylarene monomer are copolymerized sequentially in the presence of an initiator. Optionally, a monovinylarene monomer/conjugated diene monomer mixture can be polymerized to form a monovinylarene/conjugated diene block copolymer. The initiators can be any of the organomonoalkali metal compounds known for such purposes. Preferably the initiator is provided in at least three charges. Small amounts of polar organic compounds, such as ethers, thioethers, and tertiary amines can be employed in the hydrocarbon diluent to improve the effectiveness of the initiator and to randomize at least part of the monovinylarene monomer in a mixed monomer charge. The polymerization process is carried out in a hydrocarbon diluent at any suitable temperature preferably in the range of from about –100° C. to about 150° C., and at pressures sufficient to maintain the reaction mixture substantially in the liquid phase. Each monomer charge or monomer mixture charge is polymerized under solution polymerization conditions such that the polymerization of each monomer charge or monomer mixture is substantially complete before charging a subsequent charge. A coupling agent if desired can be added after polymerization is complete.

Conjugated dienes having 4 to 12 carbon atoms per molecule are suitable and can be used in the copolymers of the present invention. Those having 4 to 8 carbon atoms are preferred to optimize physical properties such as impact strength. Examples of such suitable compounds include 1,3-butadiene; 2-methyl-1,3-butadiene; 2-ethyl-1,3-butadiene; 2,3-dimethyl-1,3-butadiene; 1,3-pentadiene; 3-butyl-1,3-octadiene; and mixtures thereof. 1,3-Butadiene and isoprene are preferred dienes; and 1,3-butadiene is most preferable.

Suitable monovinylarene compounds which can be used in the copolymers include those having 8 to 18 carbon atoms per molecule, preferably 8 to 12 carbon atoms so as to enhance the ease of polymerizing. Examples of such suitable compounds include styrene; alpha-methylstyrene; 2-methylstyrene; 3-methylstyrene; 4-methylstyrene; 2-ethylstyrene; 3-ethylstyrene; 4-ethylstyrene; 4-n-propylstyrene; 4-t-butylstyrene; 2,4-dimethylstyrene; 4-cyclohexylstyrene; 4-decylstyrene; 2-ethyl-4-benzylstyrene; 4-(4-phenyl-n-butyl)styrene; 1-vinylnaphthalene; 2-vinylnaphthalene; and mixtures thereof. Styrene is the preferred monovinylarene compound due to styrene's reactivity as well as its cost efficiecy.

Generally, the monovinylarene/conjugated diene block copolymer will contain monovinylarene monomer in an amount in the range of from about 55 weight percent to about 95 weight percent based on the total weight of the final block copolymer, preferably in the range of from about 60 weight percent to about 95 weight percent, and more preferably in the range of from about 70 weight percent to about 90 weight percent so as to maximize clarity, stiffness and processibility in the final monovinylarene/conjugated diene copolymer composition. Generally the conjugated diene monomer will be present in the final block copolymer in an amount in the range of from about 45 weight percent to about 5 weight percent based on the total weight of the final block copolymer, preferably in the range of from about 40 weight percent to about 5 weight percent, and more preferably in the range of from 30 weight percent to 10 weight percent so as to maximize clarity, stiffness and processibility in the final monovinylarene/conjugated diene copolymer composition.

Polymers of component (B), amorphous poly(ethylene terephthalate), can also be referred to as modified poly (ethylene terephthalate) as they are high molecular weight polymers made by condensing ethylene glycol with terephthalic acid or dimethylterephthalate and comonomers or modifying agents, regardless of any other preparation steps involved. As used herein, "amorphous" is descriptive of polymeric compositions which have no long range order. Thus, the polymers lack any crystalline regions and therefore do not exhibit a melting point transition. This amorphous and/or modified poly(ethylene terephthalate) is modified during polymerization by incorporation into the polymer structure of comonomers or modifying agents selected from the group consisting of diols, diacids, hydroxyacids, and mixtures thereof. The comonomers or modifying agents or mixtures thereof must be selected such that their incorporation into the polymer structure can prevent crystallization from occurring thereby rendering the thus-modified poly(ethylene terephthalate) amorphous. Generally a comonomer or modifying agent is present in an amount in the range of about 5 weight percent to about 20 weight percent based on the total weight of the modified, amorphous poly(ethylene terephthalate). Such comonomers or modifying agents include but are not limited to various diols such as 1,4-butanediol; 1,4-cyclohexanedimethanol; diethylene glycol; hydrolyzed polyalkylene oxides; neopentyl glycol; butylene glycol, 1,3-propanediol; and mixtures thereof. Likewise, such comonomers or modifying agents can include but are not limited to various diacids such as isophthalic acid, adipic acid, sebacic acid, 2,6-naphthalene dicarboxylic acid, or dihydroxy acids such as p-hydroxy benzoic acid, and mixtures thereof. Mixtures of modified, amorphous poly(ethylene terephthalates) can be used. Of the suitable modifying agents, diols are preferred because diols are both readily available and cost efficient. Modified, amorphous poly(ethylene terephthalate) wherein the modifying agent contains at least 50 mole percent ethylene glycol and 20 to 50 mole percent 1,4-cyclohexanedimethanol is especially preferred as this combination is highly effective in disrupting crystallinity. A suitable, preferred, modified, amorphous poly(ethylene terephthalate) is PETG, commercially available as Kodar® 6763, from Eastman Chemical Co., Kingsport, Tenn.

The amorphous poly(ethylene terephthalate) employed herein generally has an inherent viscosity of at least about 0.2 dL/gram, preferably in the range of from about 0.2 to about 10.0 as measured by ASTM D-2857. Inherent viscosity is measured in a 3:1 volume ratio of methylene chloride and trifluoroacetic acid at 30° C. Preferably the refractive index of the amorphous poly(ethylene terephthalate) is about 1.56 to about 1.58 which is similar to the refractive index of the monovinylarene/conjugated diene employed, i.e. in the range of about 1.56 to about 1.58 measured according to ASTM 542.

Polymers of component (C), crystalline poly(ethylene terephthalate), are high molecular weight polymers made by condensing ethylene glycol with terephthalic acid or dimethylterephthalate regardless of any other preparation steps involved. The polymers can be, although not necessarily, modified with the comonomers or modifying agents listed above as used in the amorphous poly(ethylene terephthalate) or their equivalents; however, use of any comonomer or modifying agent is constrained by the requirement that incorporation of the comonomer or modifying agent into the polymer structure does not preclude crystallization of the polymer, thus, these crystalline poly(ethylene terephthlate) can also be referred to as unmodified poly(ethylene terephthalate).

The crystalline poly(ethylene terephthalate) employed herein generally has an inherent viscosity of at least about 0.2 dL/gram, preferably in the range of from about 0.5 to about 5.0 as measured in accordance with the same procedure as was used above for the amorphous poly(ethylene terephthalate).

Typical properties of Component (B), amorphous poly (ethylene terephthalate), and Component (C), crystalline poly(ethylene terepthalate), are listed in Table 1.

TABLE 1

Properties of a Typical Amorphous Poly(Ethylene Terephthlate) and of a Typical Crystalline Poly(Ethylene Terephthalate)

| Property | ASTM Test Method | Component (B) Amorphous PET | Component (C) Crystalline PET |
|---|---|---|---|
| Physical Specific gravity | D792 | 1.27 | 1.30 to 1.4 |
| Mechanical | | | |
| Tensile strength, MPa | D638 | 28 | 50 to 65 |
| Tensile Elongation, % | | 180 | 100 to 300 |
| Flexural Strength, MPa | D790 | 69 | 85 to 115 |
| Flexural Modulus, MPa | D790 | 2,000 | 2,150 to 2,800 |
| Izod Impact Strength @ 23° C., notched, J/m | D256 | 91 | 15 to 60 |
| Thermal | | | |
| Heat deflection temp. °C. | | | |
| @ 0.46 MPa | D648 | 70 | 100 to 115 |
| @ 1.82 MPa | D648 | 63 | 70 to 85 |

TABLE 1-continued

Properties of a Typical Amorphous Poly(Ethylene Terephthlate) and of a Typical Crystalline Poly(Ethylene Terephthalate)

| Property | ASTM Test Method | Component (B) Amorphous PET | Component (C) Crystalline PET |
|---|---|---|---|
| Coefficient of linear thermal expansion, × $10^{-5}/°C$. | D696 | 5.1 | 6.0 to 7.5 |
| Electrical | | | |
| Volume resistivity, $\Omega$ cm × $10^{16}$ | D257 | 0.6 | 2.0 to 3.5 |

Table 1 demonstrates differences between Components (B) and (C). Component (B) is amorphous and Component (C) is crystalline. While the two components have different chemical structures, the primary distinguishing feature is the presence or absence of crystallinity. This can be illustrated by a comparison of the properties listed in Table 1. The presence of crystallinity in Component (C) increases the density of the material as evidenced by the specific gravity. Crystallinity increases the strength and stiffness of the material; this is seen in the tensile strength and flexural modulus. Also, crystalline materials have better thermal resistance which is reflected in the heat deflection temperatures.

The composition of the polymer blend can vary broadly. Generally component (A), the monovinylarene/conjugated diene block copolymer, is present in an amount in the range of from about 10 weight percent to about 90 weight percent based on the total weight of the polymer blend, preferably from about 10 weight percent to about 80 weight percent, more preferably from about 15 weight percent to about 60 weight percent.

Component (B), the amorphous poly(ethylene terephthalate), is generally present in an amount in the range of from about 5 weight percent to about 85 weight percent based on the total weight of the polymer blend, preferably from about 10 weight percent to about 50 weight percent, more preferably from 20 weight percent to 40 weight percent.

Generally component (C), the crystalline poly(ethylene terepthalate), is present in an amount in the range of from about 5 weight percent to about 85 weight percent based on the total weight of the polymer blend, preferably from about 10 weight percent to about 50 weight percent, more preferably from 20 weight percent to 40 weight percent. In some applications, it is preferable to have similar amounts of Component (B) and Component (C) in the final blend polymer composition.

Polymer blends of the present invention as described above exhibit a combination of desirable characteristics. The polymer blends exhibit Gardner haze of less than about 10 percent, and preferably less than about 6 percent, measured with a Gardner Hazemeter according to ASTM 1003, using test samples of 50 mil thickness.

The polymer blends exhibit Shore D Hardness of greater than about 70 measured according to ASTM D-2240. Generally the Flexural Modulus of the polymer blends, measured according to ASTM D-648, will be greater than about 225 kilopounds per square inch (ksi). The polymer blends will exhibit a notched izod impact strength of greater than 1.2 foot pounds per inch.

Blending can be accomplished by any method known in the art. Preferably the polymers are melt blended employing any desired means such as a Banbury mixer, a hot roll, or an extruder. More preferably so as to most efficiently accomplish mixing, the polymers are melt blended employing extruder blending techniques. Single or twin screw extruders can be utilized. The polymers also can be dry blended prior to the melt blending.

Blending conditions depend upon the blending technique and polymers employed. If an initial dry blending of the polymer is employed, the blending conditions may include temperatures from room temperature up to just under the melting temperature of the polymer, and blending times in the range of a few seconds to hours, e.g. 2 seconds to 30 minutes.

During the melt blending, the temperature at which the polymers are combined in the blender will generally be in the range between the highest melting point of the polymers employed and up to about 100° C. above such melting point. At lower temperatures, thorough mixing is not easily accomplished, and at higher temperatures, a breakdown in polymer structure might be observed.

The time required for the melt blending can vary broadly and can depend on the method of blending employed. The time required is the time sufficient to thoroughly mix the components. Generally, the individual polymers are blended for a time of about 5 seconds to about 15 minutes for best mixing results.

Polymer blends can, if desired, contain additives such as stabilizers, anti-oxidants, anti-blocking agents, mold release agents, dyes, and pigments, flame retardants, as well as fillers and reinforcing agents, such as glass fibers as long as the amounts and types do not interfere with the objectives of this invention.

Polymer blends prepared according to the invention are useful for the production of articles prepared by milling, extrusion, injection molding, or blow molding.

EXAMPLE

The following example is presented to further illustrate the invention and is not meant to limit the scope thereby.

This example demonstrates the combination of clarity and mechanical properties of various polymer blends.

Monovinylarene/conjugated diene also referred to as styrene/butadiene block copolymer, amorphous poly (ethylene terephthalate) (PETG), and a crystalline poly (ethylene terephthalate) (PET) were blended employing a Werner & Pfleiderer ZSK-30 twin screw extruder.

The styrene/butadiene block copolymer (SB) was prepared employing a sequential solution polymerization and three initiator charges according to the process described in U.S. Pat. No. 4,584,346. Polymerization was allowed to continue to completion after each monomer charge. The sequence of styrene (S), butadiene (B), initiator (i), and coupling agent (CA) charges was as follows: S, i, i, S, B, i, S, B, CA. Polymerization temperature ranged from about 38° to about 110° C. and pressure ranged from about 2 psig to about 60 psig. The weight ratio of styrene to butadiene in the styrene/butadiene block copolymer designated KR03, commercially available from Phillips Petroleum Company, in Table 2 was 75/25. Following completion of the sequential polymerizations, Vikoflex® 71710, a coupling agent comprising epoxidized soybean oil, (sold by Viking Chemical Co.) was charged to the reactor. The styrene/butadiene block copolymers (KR03) were stabilized with Irganox 1076 and tris(nonylphenyl) phosphite. The KR03 exhibited melt flows in the range of from 5 g/10 min. to 15 g/10 min. measured according to ASTM D-1238, Condition G. The KR03 exhibited a Notched Izod Impact Strength greater than 0.3 ft•lbs/in. measured according to ASTM D-256.

The amorphous poly(ethylene terephthalate) (PETG) employed was ethylene-1,4-cyclohexylenedimethylene terephthalate copolymer, Kodar 6763, from Eastman chemical. The PETG exhibited a refractive index of 1.567, a Notched Izod Impact Strength of 0.82 ft•lbs/in. measured according to ASTM D-256, and Haze of 0.5% measured according to ASTM 1003.

The crystalline poly(ethylene terephthalate) (PET) employed was Ektar 9921 from Eastman Chemical. The PET (in noncrystalline state) exhibited a refractive index of 1.575 measured according to ASTM 542, Notched Izod Impact Strength of 0.37 ft•lbs/in. and Haze of 2.8% measured according to ASTM 1003.

PET and PETG were dried in a desiccant oven for 4 hrs. Components of the runs were dry blended and samples were extruded.

The results are summarized in Table 2.

TABLE 2

| Run | Composition Weight % | Flexural Modulus ksi | Notched Izod ft. · lb/in | Hardness Shore D | Haze % |
|---|---|---|---|---|---|
| 101 | KR03 | 214 | 0.43 | 65 | 2.6 |
| 102 | PET | 316 | 0.37 | 75 | 2.80 |
| 103 | PETG | 286 | 0.82 | 75 | 0.50 |
| 104 | 33PET/67PETG | 306 | 0.74 | 76 | 0.90 |
| 105 | 67PET/33PETG | 320 | 0.46 | 76 | 1.06 |
| 106 | 33KR03/67PET | 253 | 0.47 | 73 | 14.6 |
| 107 | 67KR03/33PET | 215 | 1.01 | 69 | 10.8 |
| 108 | 33KR03/67PETG | 234 | 2.66 | 73 | 116 |
| 109 | 67KR03/33PETG | 218 | 1.3 | 69 | 14.6 |
| 110 | 40KR03/40PETG/20PET | 234 | 1.36 | 72 | 5.72 |
| 111 | 40KR03/20PETG/40PET | 239 | 1.22 | 73 | 4.62 |
| 112 | 20KR03/40PETG/40PET | 265 | 5.45 | 74 | 3.94 |

KR03: K-Resin, 75:25 Styrene-Butadiene copolymer, Phillips Petroleum
PETG: Amorphous Poly(ethylene terephthalate)copolymer, Kodar 6763, Eastman Chemical
PET: Crystalline Poly(ethylene terephthalate, Ektar 9921, Eastman Chemical
Haze in percent was measured according to ASTM 1003.
Hardness (Shore D) was measured according to ASTM D-2240.
Flexural Modulus in ksi was measured according to ASTM D-648.
Notched Izod Impact Strength in ft · lb/in was measured according to ASTM D-256.

Table 2 demonstrates that polymer blends of either KR03 and PETG, or KR03 and PET, (Runs 106–109), exhibit unacceptably poor Haze characteristics and range from very poor to acceptable toughness (Notched Izod). When PET was blended with PETG, although good Haze characteristics were observed, very poor toughness was present. Nonetheless, when the 3 components (KR03/PETG/PET) were blended together, the blend exhibited significantly improved toughness as well as improved Haze characteristics.

That which is claimed:

1. A composition comprising (A) a monovinylarene/ conjugated diene block copolymer, (B) a poly(ethylene terephthalate) modified by incorporating therein during polymerization sufficient comonomers to prevent crystallization of the poly(ethylene terephthalate), and (C) a crystalline poly(ethylene terephthalate), wherein (B) and (C) are each present in an amount of at least about 5 weight percent based on the total weight of the polymer blend, wherein monovinylarene is present in said monovinylarene/conjugated diene block copolymer in an amount in the range of from about 60 weight percent to about 95 weight vpercent based on the weight of the monovinylarene/conjugated diene block copolymer, and wherein conjugated diene is present in said monovinylarene/conjugated diene block copolymer in an amount in the range of from about 40 weight percent to about 5 weight percent based on the weight of the monovinylarene/conjugated diene block copolymer.

2. A composition according to claim 1
wherein said monovinylarene in said monovinylarene/conjugated diene block copolymer is present in an amount in the range of from 70 weight percent to 90 weight percent based on the weight of the monovinylarene/conjugated diene block copolymer and wherein said conjugated diene is present in an amount in the range of from 30 weight percent to 10 weight percent based on the weight of the monovinylarene/conjugated diene block copolymer.

3. An article made from the composition of claim 1.

4. A polymer blend composition comprising:
(A) a monovinylarene/conjugated diene block copolymer present in an amount in the range of about 10 weight percent to about 90 weight percent based on the total weight of the polymer blend,
wherein said monovinylarene is present in an amount in the range of from about 60 weight percent to about 95 weight percent based on the weight of the monovinylarene/conjugated diene block copolymer and
wherein said conjugated diene is present in an amount in the range of from about 40 weight percent to about 5 weight percent based on the weight of the monovinylarene/conjugated diene block copolymer;
(B) a poly(ethylene terephthalate) modified by incorporating therein during polymerization sufficient comonomers to prevent crystallization of the poly(ethylene terephthalate) present in an amount in the range of from about 5 weight percent to about 85 weight percent based on the total weight of the polymer blend,
wherein the poly(ethylene terephthalate) is modified with a modifying agent selected from the group consisting of diols, diacids, hydroxy acids and mixtures thereof; and
(C) a crystalline poly(ethylene terephthalate) present in an amount in the range of from about 5 weight percent to about 85 weight percent based on the total weight of the polymer blend.

5. A composition according to claim 4 wherein said monovinylarene/conjugated diene block copolymer is present in an amount in the range of from about 10 weight percent to about 80 weight percent based on the total weight of the polymer blend;
wherein said modified poly(ethylene terephthalate) is present in an amount in the range of from about 10 weight percent to about 50 weight percent based on the total weight of the polymer blend; and
wherein said poly(ethylene terephthalate) is present in an amount in the range of from about 10 weight percent to about 50 weight percent based on the total weight of the polymer blend.

6. A composition according to claim 4 wherein said monovinylarene/conjugated diene block copolymer is present in an amount in the range of from about 15 weight percent to about 60 weight percent based on the total weight o the polymer blend;
wherein said modified poly(ethylene terephthalate) is present in an amount in the range of from about 20 weight percent to about 40 weight percent based o the total weight of the polymer blend; and wherein said poly(ethylene terephthalate) is present in an amount in the range of from about 20 weight percent to about 40 weight percent based on the total weight of the polymer blend.

7. A composition according to claim 4 wherein said monovinylarene in monovinylarene/conjugated diene block copolymer is styrene.

8. A composition according to claim 4 wherein said conjugated diene in said monovinylarene/conjugated diene block copolymer is butadiene.

9. A composition according to claim 4 wherein said modifying agent in component (B) is a diol.

10. A composition according to claim 4 wherein said monovinylarene/conjugated diene copolymer exhibits a refractive index of about 1.56 to about 1.58 measured according to ASTM 542.

11. A composition according to claim 4 wherein said modified poly(ethylene terephthalate) exhibits a refractive index of about 1.56 to about 1.58 measured according to ASTM 542.

12. A composition according to claim 4 wherein said poly(ethylene terephthalate) exhibits a refractive index of about 1.57 measured according to ASTM 542.

13. A composition according to claim 4 which exhibits haze of about 6 percent or less, measured with a Gardner Hazemeter according to ASTM 1003, using test specimens of 50 mil thickness.

14. A composition according to claim 13 which exhibits haze of 5.75 percent or less.

15. A composition according to claim 4 which exhibits Shore D Hardness of 70 or greater measured according to ASTM D-2240.

16. A composition according to claim 4 which exhibits Flexural Modulus of about 225 or greater kilopounds per square inch measured according to ASTM D-648.

17. A composition according to claim 4 which exhibits a Notched Izod Impact Strength of about 1.20 or greater ft•lbs/inch measured according to ASTM D-256.

18. An article made from the composition of claim 4.

19. A process for preparing a polymer blend comprising melt blending components consisting essentially of:
(A) a monovinylarene/conjugated diene block copolymer present in an amount present in an amount in the range of about 10 weight percent to about 90 weight percent based on the total weight of the polymer blend,
wherein said monovinylarene is present in an amount in the range of from about 60 weight percent to about 95 weight percent based on the weight of the monovinylarene/conjugated diene block copolymer and
wherein said conjugated diene is present in an amount in the range of from about 40 weight percent to about 5 weight percent based on the weight of the monovinylarene/conjugated diene block copolymer;
(B) a poly(ethylene terephthalate) modified by incorporating therein during polymerization sufficient comonomers to prevent crystallization of the poly(ethylene terephthalate) present in an amount in the range of from about 5 weight percent to about 85 weight percent based on the total weight of the polymer blend,
wherein the poly(ethylene terephthalate) is modified with a modifying agent selected from the group consisting of diols, diacids, hydroxy acids and mixtures thereof; and
(C) a crystalline poly(ethylene terephthalate) present in an amount in the range of from about 5 weight percent to about 85 weight percent based on the total weight of the polymer blend.

20. A composition comprising:

(A) a monovinylarene/conjugated diene block copolymer
wherein the monovinylarene is present in said monovinylarene/conjugated diene block copolymer in an amount in the range of from about 60 weight percent to about 95 weight percent based on the weight of the monovinylarene/conjugated diene block copolymer, wherein the conjugated diene is present in said monovinylarene/conjugated diene block copolymer in an amount in the range of from about 40 weight percent to about 5 weight percent based on the weight of the monovinylarene/conjugated diene block copolymer, (B) an amorphous poly(ethylene terephthalate), and (C) a crystalline poly(ethylene terephthalate), wherein said composition exhibits Gardner haze of about 6 percent or less for a 50 mil sample.

21. A composition according to claim 20
wherein said monovinylarene in said monovinylarene/ conjugated diene block copolymer is present in an amount in the range of from about 70 weight percent to about 90 weight percent based on the weight of the monovinylarene/conjugated diene block copolymer, and wherein said conjugated diene is present in an amount in the range of from about 30 weight percent to about 10 weight percent based on the weight of the monovinylarene/conjugated diene block copolymer.

22. A composition according to claim 20 wherein said monovinylarene in said monovinylarene/conjugated diene block copolymer is styrene.

23. A composition according to claim 20 wherein said conjugated diene in said monovinylarene/conjugated diene block copolymer is butadiene.

24. A composition according to claim 20 wherein said modifying agent in said amorphous poly(ethylene terephthalate) is a diol.

25. A composition according to claim 20 which exhibits Gardner haze of 5.75 percent or less.

26. A composition according to claim 20 which exhibits Shore D Hardness of 70 or greater.

27. A composition according to claim 20 which exhibits flexural modulus of about 225 or greater kilopounds per square inch.

28. A composition according to claim 20 which exhibits a notched Izod impact strength of about 1.20 or greater ft•lbs/inch.

29. An article of manufacture made from the composition of claim 20.

30. A composition comprising:

(A) a monovinylarene/conjugated diene block copolymer present in an amount in the range of from about 10 weight percent to about 90 weight percent based on the total weight of the polymer blend, wherein the monovinylarene is present in an amount in the range of from about 60 weight percent to about 95 weight percent based on the weight of the monovinylarene/conjugated diene block copolymer, and wherein the conjugated diene is present in an amount in the range of from about 40 weight percent to about 5 weight percent based on the weight of the monovinylarene/conjugated diene block copolymer;

(B) an amorphous poly(ethylene terephthalate) present in an amount in the range of from about 5 weight percent to about 85 weight percent based on the total weight of the polymer blend, wherein the amorphous poly(ethylene terephthalate) is modified with a modifying agent selected from the group consisting of diols, diacids, dihydroxy acids and mixtures thereof, such that crystallization of the polymer does not occur;

(C) a crystalline poly(ethylene terephthalate) present in an amount in the range of from about 5 weight percent to about 85 weight percent based on the total weight of the polymer blend; and wherein said composition exhibits Gardner haze of about 6 percent or less for a 50 mil sample.

31. A composition according to claim 30 wherein said monovinylarene/conjugated diene block copolymer is present in an amount in the range of from about 10 weight percent to about 80 weight percent based on the total weight of the polymer blend;

wherein said amorphous poly(ethylene terephthalate) is present in an amount in the range of from about 10 weight percent to about 50 weight percent based on the total weight of the polymer blend; and wherein said crystalline poly(ethylene terephthalate) is present in an amount in the range of from about 10 weight percent to about 50 weight percent based on the total weight of the polymer blend.

32. A composition according to claim 30 wherein said monovinylarene/conjugated diene block copolymer is present in an amount in the range of from about 15 weight percent to about 60 weight percent based on the total weight of the polymer blend;

wherein said amorphous poly(ethylene terephthalate) is present in an amount in the range of from about 20 weight percent to about 40 weight percent based on the total weight of the polymer blend; and wherein said crystalline poly(ethylene terephthalate) is present in an amount in the range of from about 20 weight percent to about 40 weight percent based on the total weight of the polymer blend.

33. A composition according to claim 30 wherein said monovinylarene in said monovinylarene/conjugated diene block copolymer is styrene.

34. A composition according to claim 30 wherein said conjugated diene in said monovinylarene/conjugated diene block copolymer is butadiene.

35. A composition according to claim 30 wherein said modifying agent in said amorphous poly(ethylene terephathalate) is a diol.

36. A composition according to claim 30 which exhibits Gardner haze of 5.75 percent or less.

37. A composition according to claim 30 which exhibits Shore D Hardness of 70 or greater.

38. A composition according to claim 30 which exhibits flexural modulus of about 225 or greater kilopounds per square inch.

39. A composition according to claim 30 which exhibits a notched Izod impact strength of about 1.20 or greater ft•lbs/inch.

40. An article of manufacture made from the composition of claim 30.

41. A process for preparing a polymer blend comprising melt blending:

(A) a monovinylarene/conjugated diene block copolymer present in an amount in the range of from about 10 weight percent to about 90 weight percent based on the total weight of the polymer blend, wherein said monovinylarene is present in an amount in the range of from about 60 weight percent to about 95 weight percent based on the weight of the monovinylarene/conjugated diene block copolymer and wherein said conjugated diene is present in an amount in the range of from about 40 weight percent to about 5 weight percent based on the weight of the monovinylarene/conjugated diene block copolymer;

(B) an amorphous poly(ethylene terephthalate) present in an amount in the range of from about 5 weight percent to about 85 weight percent based on the total weight of the polymer blend, wherein the amorphous poly(ethylene terephthalate) is modified with a modifying agent selected from the group consisting of diols, diacids, dihydroxy acids and mixtures thereof, such that crystallization of the polymer is prevented from occuring, and (C) a crystalline poly(ethylene terephthalate) present in an amount in the range of from about 5 weight percent to about 85 weight percent based on the total weight of the polymer blend.

* * * * *